(12) United States Patent
Amoroso et al.

(10) Patent No.: US 10,382,453 B2
(45) Date of Patent: *Aug. 13, 2019

(54) FILTERING NETWORK TRAFFIC USING PROTECTED FILTERING MECHANISMS

(71) Applicant: AT&T Intellectual Property I, L.P., Atlanta, GA (US)

(72) Inventors: Edward G. Amoroso, Andover, NJ (US); Nishanth Chandran, New York, NY (US); Evgene Vahlis, Toronto (CA)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/004,495

(22) Filed: Jun. 11, 2018

(65) Prior Publication Data
US 2018/0295139 A1 Oct. 11, 2018

Related U.S. Application Data

(63) Continuation of application No. 14/969,456, filed on Dec. 15, 2015, now Pat. No. 9,998,479, which is a (Continued)

(51) Int. Cl.
*G06F 21/56* (2013.01)
*H04L 29/06* (2006.01)

(52) U.S. Cl.
CPC ...... *H04L 63/1408* (2013.01); *H04L 63/0227* (2013.01); *H04L 63/0236* (2013.01); (Continued)

(58) Field of Classification Search
None
See application file for complete search history.

(56) References Cited

U.S. PATENT DOCUMENTS 6,233,565 B1 5/2001 Lewis et al.
6,674,769 B1 1/2004 Viswanath
(Continued)

FOREIGN PATENT DOCUMENTS

EP 743775 11/1996
EP 781003 6/1997
(Continued)

OTHER PUBLICATIONS

M. Zubair Rafique and Juan Caballero, "FIRMA: Malware Clustering and Network Signature Generation with Mixed Network Behaviors," Proceedings of the 16th International Symposium on Research in Attacks, Intrusions and Defenses, IMDEA Software Institute, Oct. 2013.

(Continued)

*Primary Examiner* — Madhuri R Herzog
(74) *Attorney, Agent, or Firm* — Hartman & Citrin LLC

(57) ABSTRACT

Concepts and technologies are disclosed herein for filtering network traffic using protected filtering mechanisms. An indication that traffic is to be filtered can be received, and a hash key, a signature representation, and an obfuscated signature can be identified or generated. The hash key and the signature representation can be provided to a first device without exposing the contents of the signature to the second device, and the obfuscated signature can be provided to a second device without exposing the contents of the signature to the second device. The first device and the second device can execute independent operations to collectively determine if the traffic is to be filtered.

20 Claims, 7 Drawing Sheets

Related U.S. Application Data continuation of application No. 14/064,793, filed on Oct. 28, 2013, now Pat. No. 9,219,747.

(52) U.S. Cl.
CPC ...... *H04L 63/0281* (2013.01); *H04L 63/1416* (2013.01); *H04L 63/1441* (2013.01); *G06F 21/564* (2013.01)

(56) References Cited

U.S. PATENT DOCUMENTS

| | | | |
|---|---|---|---|
| 7,320,142 B1 | 1/2008 | Kasper et al. | |
| 7,636,940 B2 | 12/2009 | Yim | |
| 7,865,608 B1 | 1/2011 | Schuba et al. | |
| 7,941,664 B2 | 5/2011 | Wheeler et al. | |
| 8,046,579 B2 | 10/2011 | Kresina | |
| 8,065,722 B2 | 11/2011 | Barford et al. | |
| 8,165,286 B2 | 4/2012 | Ciet et al. | |
| 8,230,510 B1 * | 7/2012 | Yang | G06F 21/564 709/232 |
| 8,332,649 B2 | 12/2012 | Yokota et al. | |
| 8,782,435 B1 | 7/2014 | Ghose | |
| 8,850,583 B1 | 9/2014 | Nelson et al. | |
| 2002/0065912 A1 | 5/2002 | Catchpole et al. | |
| 2002/0094084 A1 | 7/2002 | Wasilewski et al. | |
| 2003/0158960 A1 | 8/2003 | Engberg | |
| 2005/0086520 A1 | 4/2005 | Dharmapurikar et al. | |
| 2005/0091545 A1 | 4/2005 | Soppera | |
| 2006/0282681 A1 | 12/2006 | Scheidt et al. | |
| 2007/0055753 A1 | 3/2007 | Robb | |
| 2010/0005118 A1 | 1/2010 | Sezer | |
| 2010/0071054 A1 | 3/2010 | Hart | |
| 2010/0071068 A1 | 3/2010 | Bauschert et al. | |
| 2011/0087779 A1 | 4/2011 | Martin et al. | |
| 2012/0204266 A1 | 8/2012 | Yoo | |
| 2013/0152199 A1 | 6/2013 | Capalik | |
| 2014/0108786 A1 | 4/2014 | Kreft | |
| 2014/0123279 A1 * | 5/2014 | Bishop | H04L 63/1491 726/23 |
| 2015/0095648 A1 | 4/2015 | Nix | |

FOREIGN PATENT DOCUMENTS

| | | |
|---|---|---|
| EP | 2658166 | 10/2013 |
| JP | 2010-154098 | 7/2010 |

OTHER PUBLICATIONS

Stig Andersson, Andrew Clark and George Mohay, "Detecting Network-based Obfuscated Code Injection Attacks Using Sandboxing," Information Security Institute, Queensland University of Technology (QUT), Brisbane, AU, 2005.

U.S. Notice of Allowance dated Aug. 5, 2015 in U.S. Appl. No. 14/064,793.

U.S. Office Action dated Jul. 10, 2017 in U.S. Appl. No. 14/969,456.

U.S. Notice of Allowance dated Feb. 1, 2018 in U.S. Appl. No. 14/969,456.

\* cited by examiner

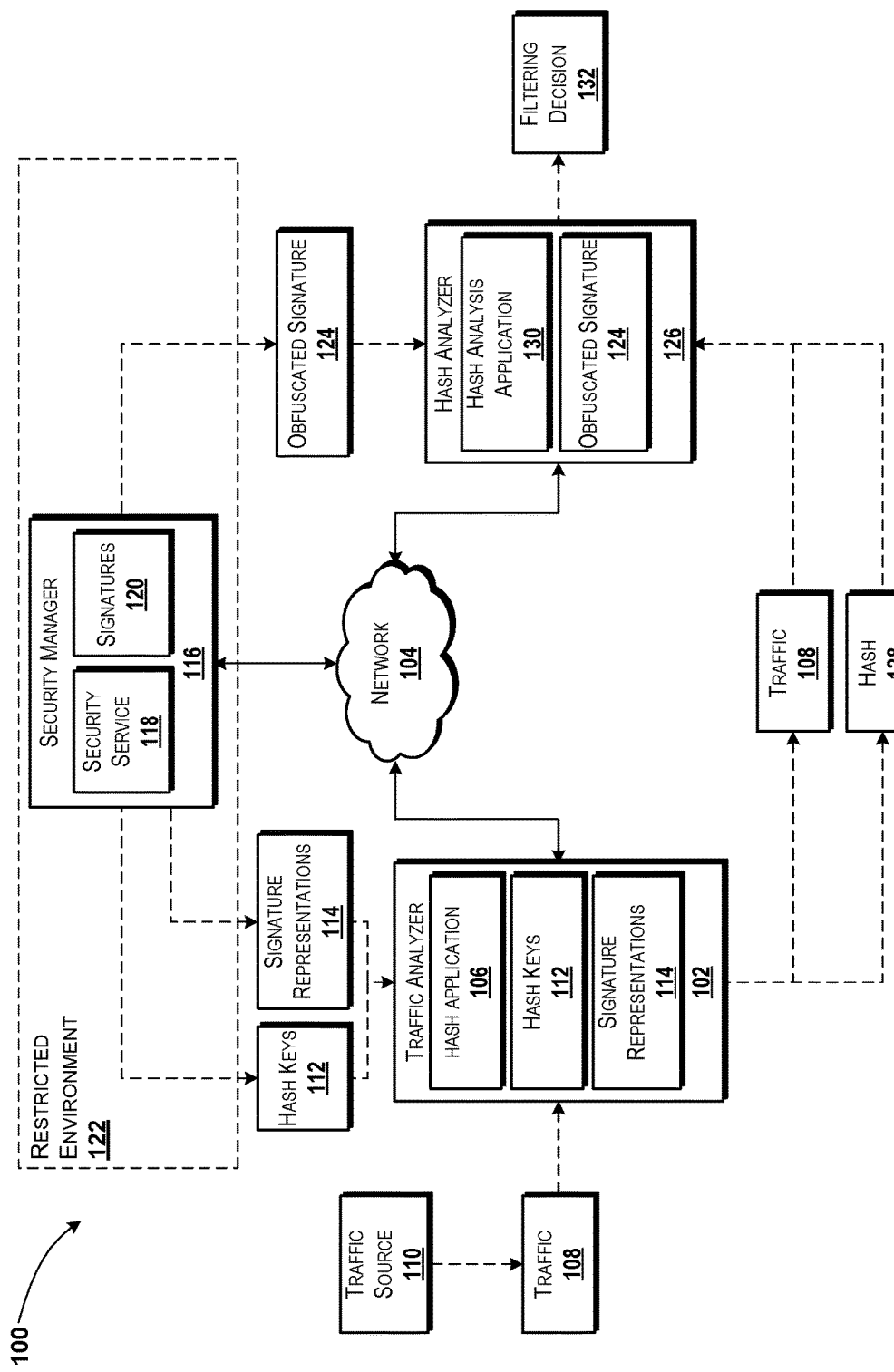

FILTERING NETWORK TRAFFIC USING PROTECTED FILTERING MECHANISMS

CROSS-REFERENCE TO RELATED APPLICATIONS

This application is a continuation of and claims priority to U.S. patent application Ser. No. 14/969,456, filed Dec. 15, 2015, and entitled "Filtering Network Traffic Using Protected Filtering Mechanisms," now U.S. Pat. No. 9,998,479, which is incorporated herein by reference in its entirety; and which is a continuation of and claims priority to U.S. patent application Ser. No. 14/064,793, filed Oct. 28, 2013 and entitled "Filtering Network Traffic Using Protected Filtering Mechanisms," now U.S. Pat. No. 9,219,747, which is incorporated herein by reference in its entirety.

BACKGROUND

Various governments and/or governmental entities may perform filtering of network traffic such as traffic associated with the Internet. In some instances, traffic can be filtered using filtering mechanisms such as signatures, or the like. These signatures may include detection rules and/or other mechanisms that can provide various governmental entities with the ability to detect cyber-attacks in early stages of the attacks before damage to targeted systems occurs.

In some cases, however, the signatures may be confidential and therefore may not be revealed to entities outside of a particular sensitive compartmented information facility ("SCIF") or other restricted environment such as a secure network, or the like. In particular, some signatures may be developed based upon years of covert operations and/or investigations domestically and/or abroad, and revealing contents of the signatures may jeopardize not only the various operations and/or investigations, but also may literally put lives at risk and/or subject sources of the information to retaliation, imprisonment, or even physical harm. Thus, the government often has signatures at its disposal that cannot be shared with commercial or other entities due to these and other concerns.

Because these signatures are not shared with private and/or commercial entities, many cyber-attacks that may be preventable with knowledge of the contents of the signatures may not be blocked. This can result in extensive damage to networks and/or systems that otherwise may be preventable.

SUMMARY

The present disclosure is directed to filtering network traffic using protected filtering mechanisms. The filtering mechanisms can include, in various embodiments, signatures such as malware signatures, or the like. These signatures may be stored at a secured facility such as a sensitive compartmented information facility or other restricted environment that may protect the signatures from being revealed to unauthorized entities. In some embodiments, a security manager or other computing device can host or execute a security service to allow use of the signatures without revealing contents of the signatures to unauthorized entities.

In some embodiments, the security manager can communicate with two or more devices to provide the functionality described herein. The two or more devices can include, but are not limited to, a traffic analyzer and a hash analyzer. The traffic analyzer can include a computing device that executes a hash application, and the hash analyzer can include a computing device that executes a hash analysis application.

The functionality of the security manager can be provided by two or more devices, the functionality of the traffic analyzer can be provided by two or more devices, and the functionality of the hash analyzer can be provided by two or more devices. Thus, some embodiments of the concepts and technologies described herein operate as a cloud service that can be provided and/or called by multiple devices.

The security manager can analyze a signature and generate a signature representation that represents the signature. Thus, for example, the security manager can define a signature representation that defines a type or category of data that is relevant to a particular signature. The security manager also can generate, obtain, and/or assign a hash key for a particular signature representation. The hash key can, when applied to data, generate a hash value. Additionally, the security manager can generate an obfuscated signature that represents the signature. The security manager can replace sensitive information in the signature with obfuscated data in the obfuscated signature. The obfuscated data can include, in various embodiments, a hash value that is generated by the security manager by applying the hash key to the sensitive information included in the signature.

The traffic analyzer can receive traffic from a traffic source and identify in the traffic data indicated in the signature representation. For example, if the signature representation indicates that a name or location is relevant to a particular signature, the traffic analyzer can search the traffic for names or locations. If the traffic analyzer locates the relevant data in the traffic, the traffic analyzer can apply the hash key to the relevant data to generate a hash value ("hash"). The traffic analyzer can output the hash and the traffic to the hash analyzer.

The hash analyzer can analyze the hash and the obfuscated signature to determine if the hash matches a hash value included in the obfuscated signature. If the hash analyzer determines that the hash matches the hash value, the hash analyzer can determine if the obfuscated signature indicates blocking the traffic or allowing the traffic, and implement the determined indication. In various embodiments, the hash analyzer can output a filtering decision, which can be implemented by the hash analyzer and/or other entities in communication with the hash analyzer. Thus, various embodiments of the concepts and technologies described herein allow use of sensitive signatures to generate and implement a filtering decision for traffic without revealing contents of the signatures to unauthorized entities.

According to one aspect of the concepts and technologies disclosed herein, a method is disclosed. The method can include receiving, at a processor that executes a security service, an indication that traffic is to be filtered. The processor can identify a hash key to be provided to a first device that is to filter the traffic and a signature representation that is to be used by the first device that is to filter the traffic. The signature representation can represent a signature that is accessible to the processor and inaccessible to the first device. The method also can include generating, by the processor, an obfuscated signature that is to be used by a second device that is to filter the traffic. The obfuscated signature can include a hash value generated using the hash key. The method further can include sharing the hash key and the signature representation with the first device without exposing contents of the signature to the first device, and sharing the obfuscated signature with the second device without exposing the contents of the signature to the second device.

In some embodiments, identifying the hash key can include obtaining the hash key from a data storage location within a restricted environment that is inaccessible to the first device. Identifying the signature representation can include generating the signature representation based upon the signature. The signature can be stored at a further data storage device within the restricted environment. In some embodiments, the first device can include a traffic analyzer that executes a hash application that, when executed by the traffic analyzer, causes the traffic analyzer to perform operations. The operations can include analyzing the traffic to identify data that corresponds to information included in the signature representation, generating a hash value of the data, and outputting the hash value.

In some embodiments, the second device can include a hash analyzer that executes a hash analysis application. The hash analysis application, when executed by the hash analyzer, can cause the hash analyzer to perform operations. The operations can include receiving the hash value and the traffic, determining, based upon the hash value and the obfuscated signature, if the traffic is to be blocked, and outputting a filtering decision that indicates if the traffic is to be blocked. The indication can include a request generated by a traffic analyzer in communication with the processor, and the request can request filtering of the traffic using the signature.

In some embodiments, the first device can include two or more server computers. Each of the two or more server computers can execute a hash application. The second device can include two or more server computers. Each of the two or more server computers can execute a hash analysis application. In some embodiments, the processor can include a server computer hosted within a restricted environment, and the signature can be stored within the restricted environment. In some embodiments, the restricted environment can include a sensitive compartmented information facility.

According to another aspect of the concepts and technologies disclosed herein, a system can include a processor, and a memory that stores computer-executable instructions. The instructions, when executed by the processor, can cause the processor to perform operations. The operations can include receiving a request to filter traffic using a signature, identifying a hash key to be provided to a first device that is to filter the traffic, and identifying a signature representation to be used by the first device that is to filter the traffic. The signature representation can represent a signature that is inaccessible to the first device. The operations also can include generating an obfuscated signature that is to be used by a second device that is to filter the traffic. The obfuscated signature can include a hash value generated using the hash key. The operations also can include sharing the hash key and the signature representation with the first device without exposing contents of the signature to the first device, and sharing the obfuscated signature with the second device without exposing the contents of the signature to the second device.

In some embodiments, the system can further include a restricted environment and a data storage device within the restricted environment. The processor and the memory can be located within the restricted environment, and the data storage device can store the signature. The first device can include a traffic analyzer that executes a hash application, and the second device can include a hash analyzer that executes a hash analysis application. In some embodiments, the hash application can include instructions that, when executed by the traffic analyzer, cause the traffic analyzer to perform operations. The operations performed by the traffic analyzer can include analyzing the traffic to identify data that corresponds to information included in the signature representation, generating a hash value of the data, and outputting the hash value.

In some embodiments, the hash analysis application can include instructions that, when executed by the hash analyzer, cause the hash analyzer to perform operations. The operations performed by the hash analyzer can include receiving the hash value and the traffic from the traffic analyzer, determining, based upon the hash value and the obfuscated signature, if the traffic is to be blocked, and outputting a filtering decision that indicates if the traffic is to be blocked. In some embodiments, the first device can include two or more server computers, and each of the two or more servers can execute a hash application. In some embodiments, the second device can include two or more server computers, and each of the two or more server computers can execute a hash analysis application.

According to yet another aspect, a computer storage medium is disclosed. The computer storage medium has computer-executable instructions stored thereon that, when executed by a processor, cause the processor to perform operations. The operations can include determining that traffic is to be filtered using a signature, identifying a hash key to be provided to a first device that is to filter the traffic, and identifying a signature representation to be used by the first device that is to filter the traffic. The signature representation can represent a signature that is inaccessible to the first device. The operations further can include generating an obfuscated signature that is to be used by a second device that is to filter the traffic. The obfuscated signature can include a hash value generated using the hash key. The operations also can include sharing the hash key and the signature representation with the first device without exposing contents of the signature to the first device, and sharing the obfuscated signature with the second device without exposing the contents of the signature to the second device.

In some embodiments, sharing the hash key and the signature representation with the first device can include sharing the hash key and the signature representation with a traffic analyzer. The traffic analyzer can execute a hash application to perform operations that include analyzing the traffic to identify data that corresponds to information included in the signature representation, generating a hash value of the data, and outputting the hash value. In some embodiments, sharing the obfuscated signature with the second device can include sharing the obfuscated signature with a hash analyzer. The hash analyzer can execute a hash analysis application to perform operations that include receiving the hash value and the traffic from the traffic analyzer, determining, based upon the hash value and the obfuscated signature, if the traffic is to be blocked, and outputting a filtering decision that indicates if the traffic is to be blocked.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

BRIEF DESCRIPTION OF THE DRAWINGS

FIG. 1A is a system diagram illustrating an operating environment for the various embodiments disclosed herein, according to some illustrative embodiments.

DETAILED DESCRIPTION

Figure 1B:
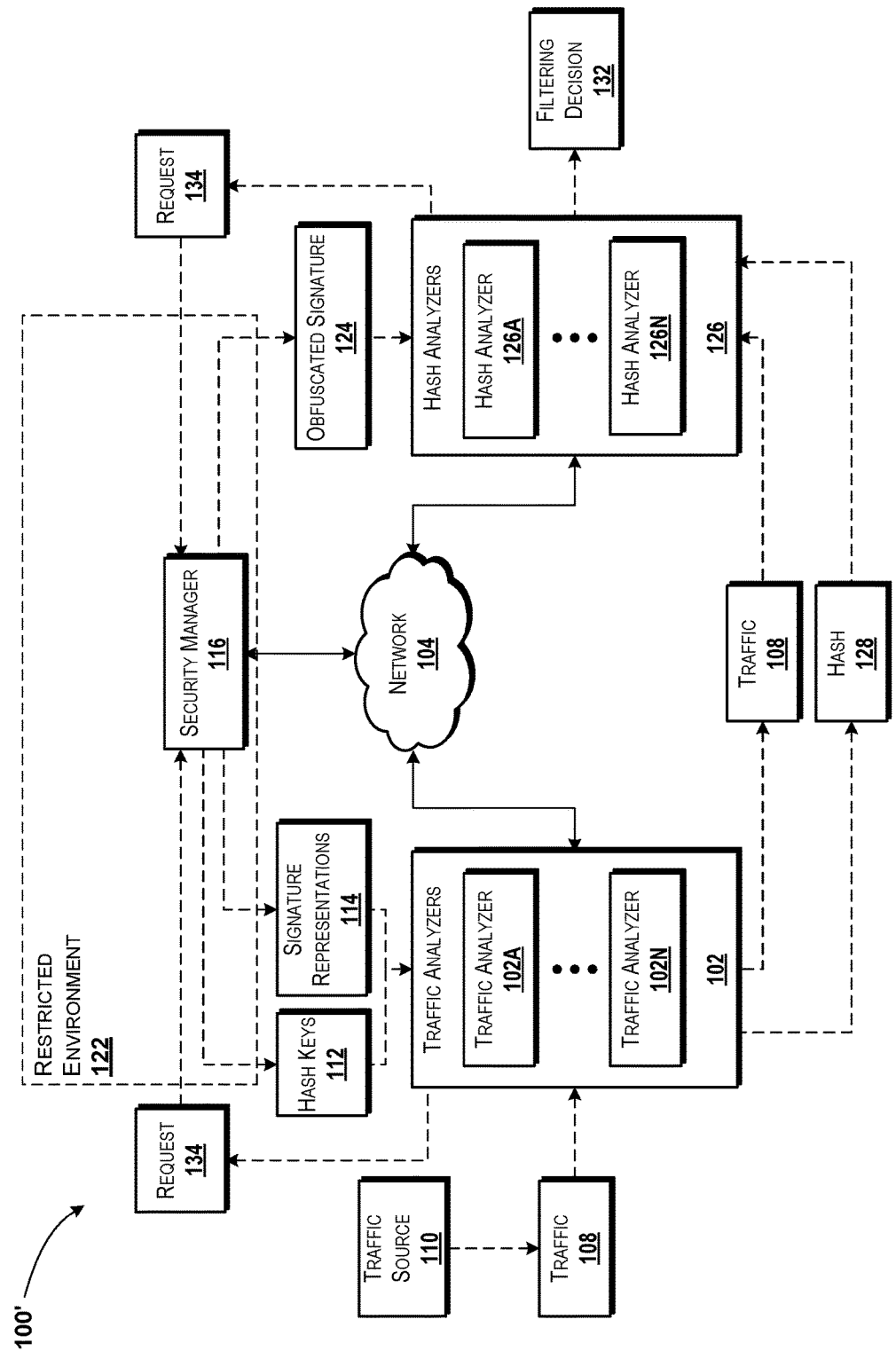
FIG. 1B is a system diagram illustrating an illustrative operating environment for the various embodiments disclosed herein, according to some other illustrative embodiments.

The following detailed description is directed to filtering network traffic using protected filtering mechanisms. In some embodiments, a security manager can communicate with a traffic analyzer and a hash analyzer. The traffic analyzer can include a server computer or other computing device that executes a hash application, and the hash analyzer can include a server computer or other computing device that executes a hash analysis application. The security manager can analyze a signature and generate a signature representation that represents the signature. The security manager also can generate, obtain, and/or assign a hash key for a particular signature representation. The hash key can, when applied to data, generate a hash value. The security manager also can generate an obfuscated signature that represents the signature, but replaces sensitive information with obfuscated data that can include a hash value that is generated by the security manager by applying the hash key to sensitive information included in the signature.

The traffic analyzer can receive traffic from a traffic source. The traffic analyzer can analyze the traffic to identify, based upon the signature representation, data relevant to the signature representation. If the traffic analyzer locates the relevant data in the traffic, the traffic analyzer can apply the hash key to the relevant data to generate a hash value ("hash"). The traffic analyzer can output the hash and the traffic to the hash analyzer. The hash analyzer can analyze the hash and the obfuscated signature to determine if the hash matches a hash value included in the obfuscated signature. If the hash analyzer determines that the hash matches the hash value, the hash analyzer can determine if the obfuscated signature indicates blocking the traffic or allowing the traffic, and implement the determined indication.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1A, aspects of an operating environment 100 for various embodiments of the concepts and technologies disclosed herein for filtering network traffic using protected filtering mechanisms will be described, according to an illustrative embodiment. The operating environment 100 shown in FIG. 1A includes a traffic analyzer 102 operating in communication with and/or as part of a communications network ("network") 104.

According to various embodiments, the functionality of the traffic analyzer 102 may be provided by one or more server computers, desktop computers, mobile telephones, laptop computers, deep-packet-inspection systems, other computing systems, and the like. It should be understood that the functionality of the traffic analyzer 102 can be provided by a single device, by two similar devices, and/or by two or more dissimilar devices, as will be discussed below with reference to FIG. 1B. For purposes of describing the concepts and technologies disclosed herein, the traffic analyzer 102 is described in FIG. 1A as a single server computer. It should be understood that this embodiment is illustrative, and should not be construed as being limiting in any way.

The traffic analyzer 102 can execute an operating system (not shown) and one or more application programs such as, for example, a hash application 106. The operating system is a computer program for controlling the operation of the traffic analyzer 102. The hash application 106 can include an executable program configured to execute on top of the operating system to provide various functions of the traffic analyzer 102 described herein.

The hash application 106 can be configured to analyze data associated with traffic 108. The traffic 108 can be received at the traffic analyzer 102 from one or more traffic sources 110. The hash application 106 can analyze the traffic 108 using one or more hash keys 112 and/or one or more signature representations 114. The hash keys 112 and the signature representations 114 can be generated by and/or obtained from a security manager 116 that executes a security service 118. The generation of the hash keys 112 and the signature representations 114, as well as how the security service 118 generates the hash keys 112 and the signature representations 114 based upon signatures 120 will be explained in more detail below, particularly with reference to FIG. 2.

Briefly, the security manager 116 can be located within a restricted environment 122 such as, for example, a sensitive compartmented information facility ("SCIF"). In some embodiments of the concepts and technologies described herein, the restricted environment 122 can correspond to a government SCIF that stores sensitive compartmented information ("SCI") such as malware signatures ("signatures") 120 and/or other information that may be classified. The signatures 120 may be used to monitor traffic 108 and/or to recognize or filter traffic 108 for various purposes. While the signatures 120 are illustrated in FIG. 1A as being stored at the security manager 116, it should be understood that the signatures 120 may be stored elsewhere within the restricted environment, for example, at a memory or other data storage device that is remote from the security manager 116 and/or local to the security manager 116.

While the use of the signatures 120 may be helpful in avoiding network attacks and/or other malicious traffic, the signatures 120 may be classified and therefore may be unavailable to a network or network operator associated with the traffic analyzer 102. In some embodiments, for example, disclosure of the signatures 120 could jeopardize investigations and/or may put sources of the signatures 120 in danger. Thus, these signatures 120 may not be shared and/or may be used only by devices within the restricted environment 122 to avoid disclosure. Thus, the opportunity to filter traffic and/or protect networks from malicious attacks may be limited. As such, some embodiments of the concepts and technologies described herein allow the signatures 120 to be used to filter traffic 108 without exposing the actual contents of the signatures 120 to entities outside of the restricted environment 122.

In particular, the security service 118 can generate and/or obtain, based upon the signatures 120 and/or other considerations, one or more hash keys 112 and one or more signature representations 114. The security service 118 also can generate, based upon the signatures 120, one or more obfuscated signatures 124. The security service 118 can provide the one or more hash keys 112 and the one or more signature representations 114 to a first device, for example the traffic analyzer 102 shown in FIG. 1A, and can provide the one or more obfuscated signatures 124 to a second device, for example, a hash analyzer 126 as shown in FIG. 1A. The hash keys 112, the signature representations 114, and the obfuscated signatures 124 can be generated such that the traffic analyzer 102 and the hash analyzer 126 may be unaware of the contents of the signatures 120.

In particular, the security service 118 can be configured to generate or obtain the hash keys 112, and to generate the signature representations 114 and the obfuscated signatures 124 as one time use data elements. The signatures 120 may correspond to simple signatures such as matching IP addresses, message or data packet headers, IP ranges, or the like, as well as for complex signatures that may be used for deep packet inspection to analyze payload and/or to search for specific strings. Thus, the hash keys 112, the signature representations 114, and/or the obfuscated signatures 124 can be obtained and/or generated by the security service 118 for application to almost any data within the traffic 108.

In one example, a signature 120 may indicate that traffic originating from IP addresses that begin with 123.456 is to be filtered. A simplified example of such a signature is shown below in EXAMPLE 1.

---

If ip.byte1and2 = 123.456
{
reject packet
}

---

Example 1

The actual IP address to be blocked (123.456), however, may be confidential, as explained above, and therefore the signature 120 may not be shared outside of the restricted environment by the security service 118. Embodiments of the concepts and technologies described herein can be used to enable use of the signatures 120 outside of the restricted environment 122, without disclosing sensitive information included in the signatures 120 to users of the signatures 120.

In particular, the security service 118 can obtain or generate a hash key 112 (e.g., 1c358MMMS7), and generate a hash value that corresponds to application of the hash key to the IP address of 123.456. The security service 118 also can generate an obfuscated signature 124 by applying the hash key 112 (a key k) to the signature 120 to replace 123.456 with a hash value ("H") of H(k||123456), or in this example, replacing 123.456 with a hash generated by applying the desired hash key 112 to 123.456. A simplified example of such an obfuscated signature is shown below in EXAMPLE 2.

---

If ip.byte1and2 = 99c78364a3f81b3c1beaea45a57878fe
{
reject packet
}

---

Example 2

The security service 118 also can generate a signature representation 114. The signature representation 114 can define a representation of the signature 120, but without the sensitive information (in this example, 123.456). In the above example, the signature representation 114 can inform the traffic analyzer 102 to search for a particular IP address and, if found in the traffic 108, to generate a hash of that IP address using the hash key provided to the traffic analyzer 102. It can be appreciated that the hash key 112 provided to the traffic analyzer 102 can be the same hash key 112 used by the security service 118 to generate the obfuscated signature 124. A simplified example of such a signature representation 114 is shown below in EXAMPLE 3.

---

If ip.byte1and2 = [ ]
{
reject packet
}

---

Example 3

It can be appreciated from the examples of the hash keys 112, the signature representations 114, and the obfuscated signatures 124 provided above, that possession of the hash keys 112, the signature representations 114, and the obfuscated signatures 124 may enable determination of the signatures 120. As such, the security service 118 can be configured to generate the hash keys 112, the signature representations 114, and/or the obfuscated signatures 124 as one-time use filtering mechanisms, and also may be configured to provide these elements to at least two different systems or devices that are not able to share respective components with one another.

In particular, the traffic analyzer 102 and/or the hash analyzer 126 may be operated as "black boxes" that perform operations on data to provide a binary yes or no decision without providing any indication as to why or how that determination is made. Furthermore, it should be understood that multiple hash keys 112 and multiple signature representations 114 may be provided to the traffic analyzer 102, and that as such, the traffic analyzer 102 may search for multiple strings or other data and may not be aware of what data actually triggers a decision made by the hash analyzer 126. Thus, embodiments of the concepts and technologies described herein can be used to ensure that a single device or system will not have enough information to determine the signature 120.

Based upon the above description, embodiments of the concepts and technologies described herein for analyzing traffic using complex signatures can be understood. The below example is provided to show how complex signatures may be used in accordance with various embodiments of the concepts and technologies described herein. A signature 120 may specify, for example, that traffic 108 containing a string a anywhere within the data corresponding to the traffic 108. The security service 118 can generate a hash key 112 (for example, a key k) and generate an obfuscated signature 124 for searching a hash value ("H") such as in the below simplified example shown in EXAMPLE 4.

```
If content (of the hash value) includes H(k||α)
{
reject packet
}
```

Example 4

The filtering of the traffic 108 based upon a complex signature and/or a simple signature can be substantially similar, as will be more clearly understood below.

With this brief summary of the functionality of the security service 118, the functionality of the hash application 106 can now be further understood. The hash application 106 can be configured to analyze the traffic 108 and, based upon the signature representations 114, search for specific data within the traffic 108. In the first example above, the hash application 106 may search for an IP address that includes or begins with 123.456. If the traffic analyzer 102 does not find the specific data within the traffic 108, the hash application 106 can pass the traffic 108 to the hash analyzer 126 and/or apply another signature representation 114 to the traffic 108 to identity additional or alternative data within the traffic 108.

If the traffic analyzer 102 finds the specific data within the traffic 108, the hash application 106 can generate a hash value ("hash") 128 of the specific data (in the above example, 123.456). It can be appreciated that the hash key 112 used by the traffic analyzer 102 (or the hash application 106) to generate the hash 128 can be the same hash key 112 used by the security service 118 to generate the obfuscated signature 124 provided to the hash analyzer 126. The generation of hash values based upon applying hash keys 112 to data will not be further described herein. The hash application 106 can output the hash 128 with the traffic 108 and provide, or make available, the traffic 108 and the hash 128 to the hash analyzer 126.

According to various embodiments, the functionality of the hash analyzer 126 may be provided by one or more server computers, desktop computers, mobile telephones, laptop computers, deep-packet-inspection systems, other computing systems, and the like. It should be understood that the functionality of the hash analyzer 126 also can be provided by a single device, by two similar devices, and/or by two or more dissimilar devices. For purposes of describing the concepts and technologies disclosed herein, the hash analyzer 126 is described in FIG. 1A as single a server computer. It should be understood that this embodiment is illustrative, and should not be construed as being limiting in any way.

The hash analyzer 126 can execute, for example, a hash analysis application 130 to analyze the hash 128 and the obfuscated signature 124 to determine if the traffic 108 is to be filtered or allowed. Based upon the analysis performed by the hash analyzer 126, the hash analyzer 126 can generate and output a filtering decision 132 that indicates if the traffic 108 is to be allowed or filtered.

In particular, as explained above, the obfuscated signature 124 provided to the hash analyzer 126 can include, among other things, a hash value that is generated by the security service 118 and inserted into the obfuscated signature 124. As such, the hash analysis application 130 executed by the hash analyzer 126 can be configured to determine, by analyzing the contents of the hash 128 and the obfuscated signature 124, if the traffic 108 is to be filtered or allowed. For example, if the obfuscated signature 124 indicates that traffic 108 including the hash 128 is to be blocked and the hash 128 provided by the traffic analyzer 102 matches this indication, then the hash analysis application 130 can determine that the traffic 108 is to be filtered.

Similarly, if the obfuscated signature 124 indicates that traffic 108 including the hash 128 is to be blocked and the hash 128 provided by the traffic analyzer 102 does not match the indication, then the hash analysis application 130 can determine that the traffic 108 is to be allowed. It should be understood that the presence or absence of a particular hash 128 can be used to allow or block the traffic 108, and as such, the above examples are illustrative and should not be construed as being limiting in any way.

Based upon the analysis performed by the hash analysis application 130, the hash analyzer 126 can determine if the traffic 108 is to be blocked or filtered. The hash analysis application 130 can generate a filtering decision 132 that corresponds to this determination. In some embodiments, the hash analyzer 126 outputs the filtering decision 132, while in some other embodiments, the hash analyzer 126 can enforce the filtering decision 132 against the traffic 108. As such, the hash analyzer 126 can also function as a filtering mechanism to block or allow traffic 108 based upon a filtering decision made by the hash analyzer 126 and/or other systems or entities. It should be understood that this example is illustrative and therefore should not be construed as being limiting in any way.

FIG. 1A illustrates one traffic analyzer 102, one network 104, one traffic source 110, one security service 118, one restricted environment 122, and one hash analyzer 126. It should be understood, however, that various implementations of the operating environment 100 can include zero, one, or more than one traffic analyzer 102, zero, one, or more than one network 104, zero, one, or more than one traffic source 110, zero, one, or more than one security service 118, zero, one, or more than one restricted environment 122, and zero, one, or more than one hash analyzer 126. As such, the illustrated embodiment should be understood as being illustrative, and should not be construed as being limiting in any way.

Referring now to FIG. 1B, aspects of an operating environment 100' for various embodiments of the concepts and technologies disclosed herein for filtering network traffic using protected filtering mechanisms will be described, according to another illustrative embodiment. The operating environment 100' shown in FIG. 1B illustrates an implementation of an operating environment similar to the operating environment 100 shown in FIG. 1A, but implements one or more of the traffic analyzer 102, the security manager 116, and/or the hash analyzer 126 in a distributed computing (e.g., cloud computing) environment.

As shown in FIG. 1B, the operating environment 100' can include a security manager 116 operating within a restricted environment 122. While the various components of the security manager 116 are not shown in FIG. 1B for simplicity, it should be understood that the security manager 116 shown in FIG. 1B can include the same and/or alternative components relative to the security manager 116 shown in FIG. 1A. The security manager 116 can be provided by a single computing device and/or by multiple computing devices. Additionally, FIG. 1B illustrates traffic 108 being generated by a single traffic source 110. As explained above, one or more than one traffic source 110 may generate the traffic 108 in FIGS. 1A and/or 1B.

As shown in FIG. 1B, the operating environment 100' can include a number of traffic analyzers 102, for example the traffic analyzers 102A-N (hereinafter collectively and/or generically referred to as the "traffic analyzers 102"). One or more of the traffic analyzers 102 can obtain and/or analyze traffic 108 using the hash keys 112 and/or the signature representations 114 shown and discussed above with regard to FIG. 1A. In some embodiments, each of the traffic analyzers 102 receives the same hash keys 112 and signature representations 114, while in some other embodiments, each of the traffic analyzers 102 receives different hash keys 112 and/or signature representations 114. It should be understood that these examples are illustrative and therefore should not be construed as being limiting in any way.

The operating environment 100' also can include a number of hash analyzers 126, for example the hash analyzers 126A-N (hereinafter collectively and/or generically referred to as the "hash analyzers 126"). One or more of the hash analyzers 126 can obtain and/or analyze traffic 108, hashes 128, and/or obfuscated signatures 124 shown and discussed above with regard to FIG. 1A. In some embodiments, each of the hash analyzers 126 receives the same hashes 128, traffic 108, and/or obfuscated signatures 124, while in some other embodiments, each of the hash analyzers 126 receives different hashes 128, traffic 108, and/or obfuscated signatures 124. It should be understood that these examples are illustrative and therefore should not be construed as being limiting in any way.

While not shown in FIG. 1B, it should be understood that the traffic analyzers 102 shown in FIG. 1B can include one or more of the same components shown in FIG. 1A with regard to the traffic analyzer 102. Similarly, it should be understood that the hash analyzers 126 shown in FIG. 1B can include one or more of the same components shown in FIG. 1A with regard to the hash analyzer 126.

As shown in FIG. 1B, one or more of the traffic analyzers 102 and/or one or more of the hash analyzers 126 can be configured to generate requests 134 to obtain the hash keys 112, the signature representations 114, and/or the obfuscated signatures 124, in some embodiments. In particular, one or more of the traffic analyzers 102 can be configured to generate the request 134 upon receiving the traffic 108 and/or upon determining that the traffic 108 is to be filtered. Alternatively, the traffic analyzers 102 can be configured to implicitly request the hash keys 112 and/or the signature representations 114 without generating explicit requests 134. Thus, the requests 134 shown in FIG. 1B are for illustration and should not be construed as being limiting in any way.

Similarly, one or more of the hash analyzers 126 can be configured to generate the request 134 for the obfuscated signature 124 upon receiving the traffic 108 and/or the hash 128 from the traffic analyzers 102. In some embodiments, one or more of the hash analyzers 126 can be configured to generate the request 134 for the obfuscated signature 124 upon determining that the traffic 108 is to be filtered. In some embodiments, the traffic analyzers 102 can inform the hash analyzer 126 that traffic 108 is to be filtered, and the hash analyzer 126 can obtain the obfuscated signatures 124 by generating the request 134. In some other embodiments, the security manager 116 can send the obfuscated signatures 124 to the hash analyzer 126 in response to receiving an implicit or explicit request from the traffic analyzer 102 and/or any other entity. Thus, it again should be understood that the requests 134 shown in FIG. 1B are for illustration and should not be construed as being limiting in any way.

Figure 2:
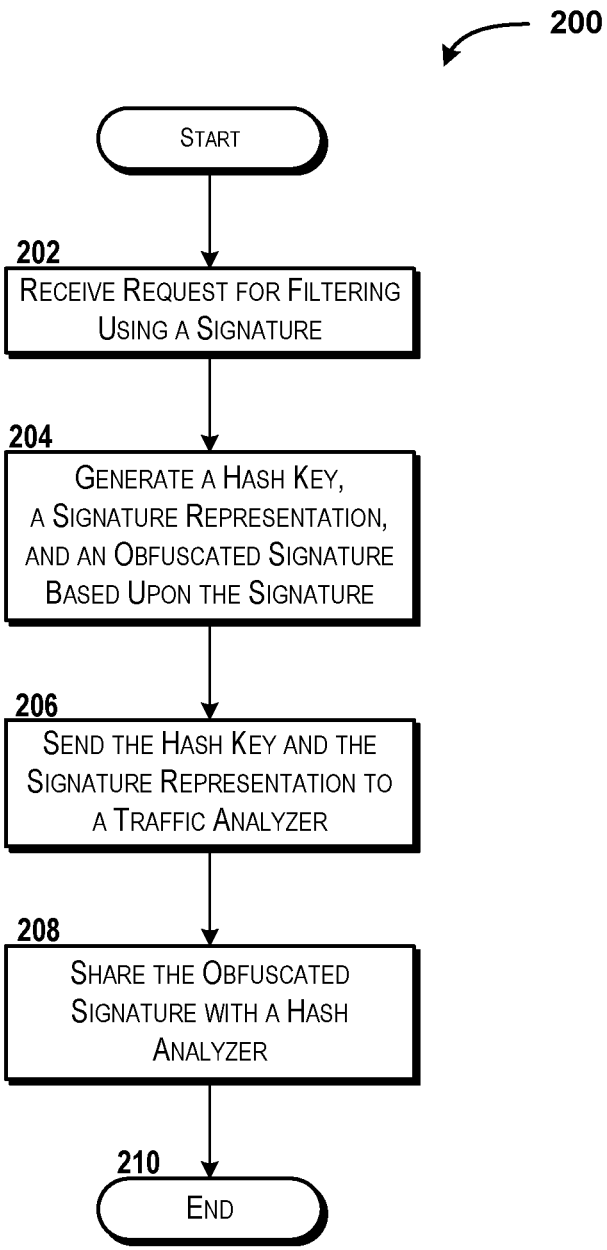
FIG. 2 is a flow diagram showing aspects of a method for supporting filtering of traffic using protected filtering mechanisms, according to an illustrative embodiment.

Turning now to FIG. 2, aspects of a method 200 for supporting filtering of traffic using protected filtering mechanisms will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the traffic analyzer 102, the security manager 116, and/or the hash analyzer 126 to perform one or more operations and/or causing the processor to direct other components of the computing system or device to perform one or more of the operations.

For purposes of illustrating and describing the concepts of the present disclosure, the methods disclosed herein are described as being performed by one or more of the traffic analyzer 102, the security manager 116, and/or the hash analyzer 126 via execution of one or more software modules such as, for example, the hash application 106, the security service 118, and/or the hash analysis application 130. It should be understood that additional and/or alternative devices and/or network nodes can provide the functionality described herein via execution of one or more modules, applications, and/or other software including, but not limited to, the hash application 106, the security service 118, and/or the hash analysis application 130. Thus, the illustrated embodiments are illustrative, and should not be viewed as being limiting in any way.

The method 200 begins at operation 202. In operation 202, the security manager 116 receives a request for filtering using a signature 120. As explained above, the request received in operation 202 can correspond to an explicit request or an implicit request. For example, the request received in operation 202 can correspond to a request 134 generated by the traffic analyzer 102 in response to receiving traffic 108 that is to be filtered, an indication that traffic 108 is to be filtered, and/or the like. Furthermore, the request received in operation 202 can be generated by other entities or devices including, but not limited to, the hash analyzer 126 or other network nodes or devices. Because the security manager 116 can interact with various devices and/or systems to filter traffic without requiring implicit or explicit requests, it should be understood that the functionality described herein with reference to operation 202 may be omitted in various embodiments of the method 200 as indicated above.

From operation 202, the method 200 proceeds to operation 204. In operation 204, the security manager 116 can generate a hash key 112, a signature representation 114, and an obfuscated signature 124 based upon the signature 120. As explained above with reference to FIGS. 1A-1B, the security manager 116 can generate the hash keys 112 or have stored various hash keys 112 that can be used to generate hash values for various strings, data, or the like. Thus, generating the hash keys 112 as illustrated in FIG. 2 can correspond to the security manager 116 retrieving the hash keys 112 from a local or remote data storage device or generating the hash keys 112 at the security manager 116. Additionally, or alternatively, the security manager 116 can instruct other devices or systems to generate and/or obtain the hash keys 112 from various places. As such, it should be understood that the hash keys 112 can be obtained or generated from or at various locations and/or at various times.

The security manager 116 also can generate the signature representations 114. As explained in additional detail herein, the signature representations 114 can be generated by the security manager 116 to indicate data within the traffic 108 that is to be located by the traffic analyzer 102. For example, if the signature 120 that is stored at the restricted environment 122 and/or accessible by the security manager 116 indicates that traffic from certain IP addresses is to be blocked, the signature representation 114 can be generated by the security manager 116 to indicate that IP addresses associated with traffic 108 are to be determined and/or located. It should be understood that this example is illustrative and therefore should not be construed as being limiting in any way.

As explained herein, the signature representations 114 can be structured such that possession of the signature representations 114 and/or the hash keys 112 does not reveal any confidential signatures 120 and/or information associated with the signatures 120. In some embodiments, the security manager 116 can generate multiple signature representations 114, though this is not necessarily the case.

The security manager 116 also can generate the obfuscated signatures 124. As explained in additional detail herein, the obfuscated signatures 124 can be generated by the security manager 116 to indicate data that, if identified or located within the traffic 108 and/or the hashes 128, will satisfy a filtering rule (blocking or allowing). For example, if the signature 120 that is stored at the restricted environment 122 and/or accessible by the security manager 116 indicates that traffic from certain IP addresses is to be blocked, the obfuscated signature 124 can be generated by the security manager 116 to indicate that traffic 108 including a hash value that represents the particular IP address will be blocked or allowed. It should be understood that this example is illustrative and therefore should not be construed as being limiting in any way.

In some embodiments, the security manager 116 can be configured to generate one or more of the hash keys 112, the signature representations 114, and/or the obfuscated signatures 124 as one-time-use ("OTU") security mechanisms. As explained above, neither of the traffic analyzer 102 and the hash analyzer 126 is in possession of enough data to determine (e.g., by reverse engineering) the contents of the signatures 120. If, however, both the traffic analyzer 102 and the hash analyzer 126 are compromised, an attacker may be able to piece together one version of the signature 120. Thus, some embodiments of the security manager 116 are configured to generate OTU security mechanisms to limit the damage of any successful attack on both the traffic analyzer 102 and the hash analyzer 126. It should be understood that these examples are illustrative and therefore should not be construed as being limiting in any way.

From operation 204, the method 200 proceeds to operation 206. In operation 206, the security manager 116 shares the hash key 112 and the signature representation 114 generated in operation 204 with the traffic analyzer 102. As explained above, particularly with reference to FIG. 1B, it should be understood that the security manager 116 can share the hash key 112 and the signature representation 114 with one or more traffic analyzers 102. In some embodiments, the security manager 116 shares the hash keys 112 and the signature representation 114 with the traffic analyzer 102 by transmitting the hash key 112 and the signature representation 114 to the traffic analyzer 102. In some other embodiments, the security manager 116 makes the hash key 112 and the signature representation 114 available for access by the traffic analyzer 102, for example by transmitting the hash key 112 and the signature representation 114 to a data storage device outside of the restricted environment 122. Because the security manager 116 can make the hash key 112 and the signature representation 114 available to the traffic analyzer 102 in any number of manners, it should be understood that these examples are illustrative and therefore should not be construed as being limiting in any way.

From operation 206, the method 200 proceeds to operation 208. In operation 208, the security manager 116 shares the obfuscated signature 124 generated in operation 204 with the hash analyzer 126. As explained above, particularly with reference to FIG. 1B, it should be understood that the security manager 116 can share the obfuscated signature 124 with one or more hash analyzers 126. In some embodiments, the security manager 116 shares the obfuscated signature 124 with the hash analyzer 126 by transmitting the obfuscated signature 124 to the hash analyzer 126. In some other embodiments, the security manager 116 makes the obfuscated signature 124 available for access by the hash analyzer 126, for example by transmitting the obfuscated signature 124 to a data storage device outside of the restricted environment 122. Because the security manager 116 can make the obfuscated signature 124 available to the hash analyzer 126 in various manners, and not necessarily in the manners illustrated and described herein, it should be understood that these examples are illustrative and therefore should not be construed as being limiting in any way.

From operation 208, the method 200 proceeds to operation 210. The method 200 ends at operation 210.

Figure 3:
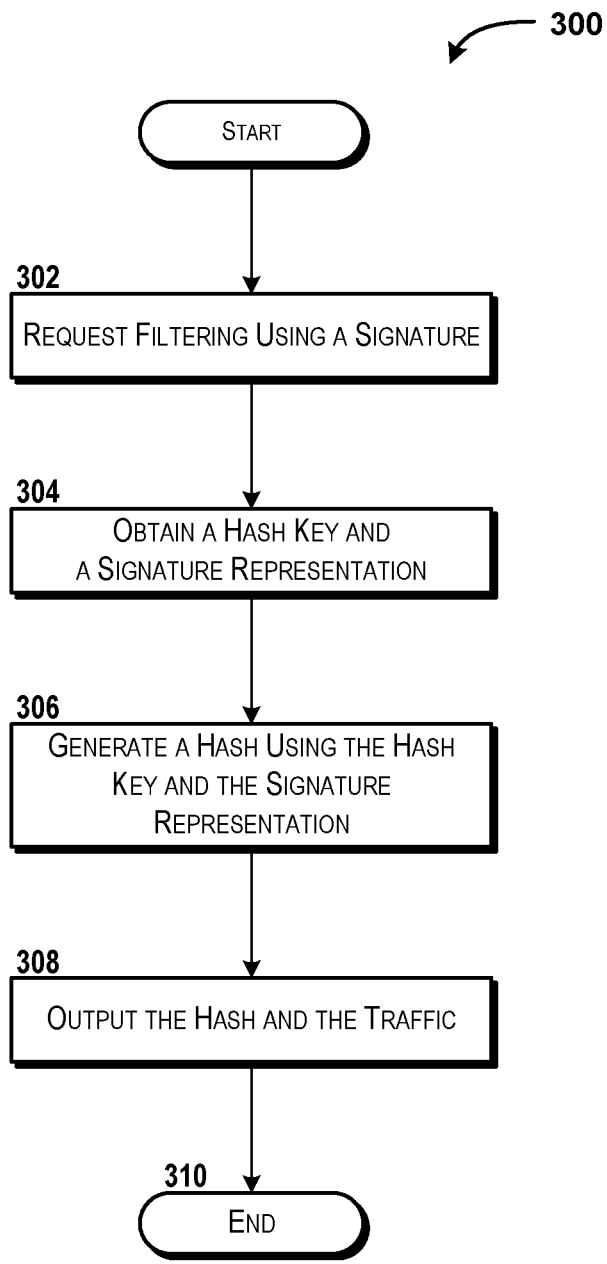
FIG. 3 is a flow diagram showing aspects of a method for analyzing traffic using hash keys and signature representations, according to an illustrative embodiment.

Turning now to FIG. 3, aspects of a method 300 for analyzing traffic using hash keys 112 and signature representations 114 will be described in detail, according to an illustrative embodiment. The method 300 begins at operation 302. At operation 302, the traffic analyzer 102 requests filtering using a signature 120. According to various embodiments, the signatures 120 are confidential and/or cannot be shared for various reasons. As noted above, sharing the signatures 120 with other entities may reveal sources of the information included in the signatures 120, which in turn may jeopardize collection of the information and/or put the sources of the information at risk of harm. As such, these signatures 120 often are hidden and/or not shared.

In some embodiments, the request generated in operation 302 can correspond to an explicit request generated by the traffic analyzer 102, for example, a request 134 as discussed above with reference to FIG. 1B. The request 134 can be generated by the traffic analyzer 102 in response to receiving traffic 108 that is to be filtered, in response to receiving an indication that traffic 108 is to be filtered, or the like. In some other embodiments, the traffic analyzer 102 is configured to obtain data from the security manager 116 without generating an explicit request, and as such, the request generated in operation 302 can correspond to an attempt by the traffic analyzer 102 to obtain this information (e.g., the signatures 120, the hash keys 112, and/or the signature representations 114). Thus, the request generated in operation 302 may be an explicit or implicit request and therefore may not be included in all embodiments of the method 300.

From operation 302, the method 300 proceeds to operation 304. At operation 304, the traffic analyzer 102 can obtain one or more hash keys 112 and a signature representation 114. The hash keys 112 and the signature representations 114 can be transmitted to the traffic analyzer 102, in some embodiments. In some other embodiments, the traffic analyzer 102 can access the hash keys 112 and/or the signature representations 114, which can be stored at a remote data storage device, if desired.

From operation 304, the method 300 proceeds to operation 306. At operation 306, the traffic analyzer 102 can generate one or more hashes 128 using the one or more hash keys 112 received in operation 304. While not illustrated separately in FIG. 3, it should be understood that the traffic analyzer 102 can identify the data to use as input for the hash generation illustrated in operation 306 based upon the contents of the signature representation 114. In particular, if the signature representation indicates that data originating from a particular IP address is to be blocked, the traffic analyzer 102 can search the data included in the traffic 108 for IP addresses, and generate hash values of one or more of the IP addresses.

Similarly, if the signature representation 114 indicates that data associated with particular headers, cities or other locations, times or dates, contents, or the like are to be blocked or allowed, operation 306 can include locating these headers, locations, times, dates, contents, or the like, and generating hash values of those data. Because signatures 120 can indicate restricting data based upon almost any aspect of the data included in the traffic 108, it should be understood that the above examples are illustrative and therefore should not be construed as being limiting in any way.

From operation 306, the method 300 proceeds to operation 308. At operation 308, the traffic analyzer 102 outputs the one or more hashes 128 generated in operation 306 and/or the traffic 108. The traffic 108 may or may not be output by the traffic analyzer 102, and instead may merely be forwarded or exposed to the hash analyzer 126 with the hashes 128. Furthermore, the hashes 128 and the traffic 108 may be made available to the hash analyzer 126 without actually "outputting" these data, per se. As such, it should be understood that the illustrated embodiment is one example and should not be construed as being limiting in any way.

From operation 308, the method 300 proceeds to operation 310. The method 300 ends at operation 310.

Figure 4:
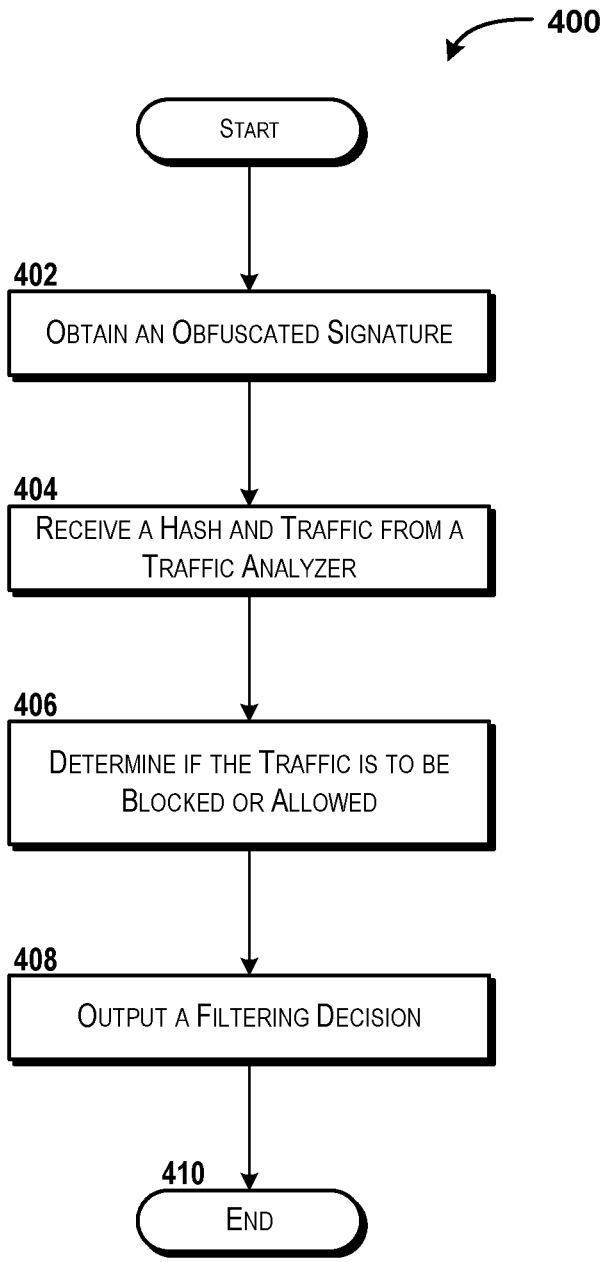
FIG. 4 is a flow diagram showing aspects of a method for generating a filtering decision based upon traffic, a hash, and an obfuscated signature, according to an illustrative embodiment.

Turning now to FIG. 4, aspects of a method 400 for generating a filtering decision based upon traffic, a hash, and an obfuscated signature will be described in detail, according to an illustrative embodiment. The method 400 begins at operation 402. At operation 402, the hash analyzer 126 obtains an obfuscated signature 124 from the security manager 116. As explained above with reference to FIGS. 1B-3, the hash analyzer 126 can obtain the obfuscated signature 124 in response to a request 134 from hash analyzer 126. Additionally, or alternatively, the hash analyzer 126 can obtain the obfuscated signature 124 without explicitly requesting the obfuscated signature 124. For example, the obfuscated signature 124 can be provided to the hash analyzer 126 in response to the traffic analyzer 102 requesting the hash keys 112 and/or the signatures representations 114, in various devices or systems determining that traffic 108 to be filtered is being sent to or received by the traffic analyzer 102 and/or the hash analyzer 126, and/or in response to various other considerations.

From operation 402, the method 400 proceeds to operation 404. At operation 404, the hash analyzer 126 receives one or more hashes 128 and traffic 108 from the traffic analyzer 102. In light of the above description of receiving the obfuscated signatures 124, it should be understood that the functionality described herein with respect to operations 402 and 404 may occur in reverse order, i.e., operation 402 may be followed by operation 404 or operation 404 may be followed by operation 402. It should be understood that these examples are illustrative and therefore should not be construed as being limiting in any way.

The hashes 128 can correspond to particular data within the traffic 108 such as an IP address, a name, content headers, time or date information, content flags or content information, recipient name information, file formats, or the like. As explained in detail above, particularly with reference to FIG. 1A, the hashes 128 can correspond to hashed data within the traffic 108 that, if included in the obfuscated signatures 124 received by the hash analyzer 126, indicate that the traffic 108 satisfies one or more of the signatures 120.

From operation 404, the method 400 proceeds to operation 406. At operation 406, the hash analyzer 126 determines if the traffic 108 is to be filtered or if the traffic is to be allowed. In particular, the hash analyzer 126 can compare one or more hashes 128 to one or more obfuscated signatures 124 to determine if the traffic 108 contains data that is to trigger a filtering decision. In some examples described above with reference to FIG. 1A, wherein traffic 108 is to be filtered based at least partially upon an IP address associated with the traffic 108, the hash analyzer 126 can compare the hashes 128 received from the traffic analyzer 102, which can correspond to hash values generated by hashing IP addresses in the traffic 108, with an obfuscated signature 124 that will contain a hashed representation of an IP address as well.

If the hash value included in the obfuscated signature 124 matches one or more hashes 128 generated by the traffic analyzer 102, the hash analyzer 126 can determine that the traffic 108 is to be blocked or allowed (depending upon the rule defined in the obfuscated signature 124 or elsewhere). It should be understood that this example is illustrative and therefore should not be construed as being limiting in any way.

As such, operation 406 can include the hash analyzer 126 comparing the hashes 128 to hash values included in the obfuscated signatures 124 to determine if the obfuscated signature 124 is relevant to the traffic 108. Furthermore, operation 406 can include determining if the traffic 108 is to be blocked or allowed based at least partially upon the obfuscated signature 124.

From operation 406, the method 400 proceeds to operation 408. At operation 408, the hash analyzer 126 outputs a filtering decision 132. Based upon the analysis in operation 406, the hash analyzer 126 can determine if the traffic 108 is to be blocked or allowed. Operation 408 can include generating an indication of the filtering decision 132 and/or taking an action (or generating instructions for taking an action) to implement the filtering decision 132. Thus, for example, operation 408 can include blocking the traffic 108, issuing an instruction to block the traffic 108, allowing or issuing instructions to allow the traffic 108, outputting a filtering decision 132, and/or taking other actions. Because the hash analyzer 126 can be configured to take almost any action in response to determining how the traffic 108 is to be handled, it should be understood that these examples are illustrative and therefore should not be construed as being limiting in any way.

From operation 408, the method 400 proceeds to operation 410. The method 400 ends at operation 410.

Figure 5:
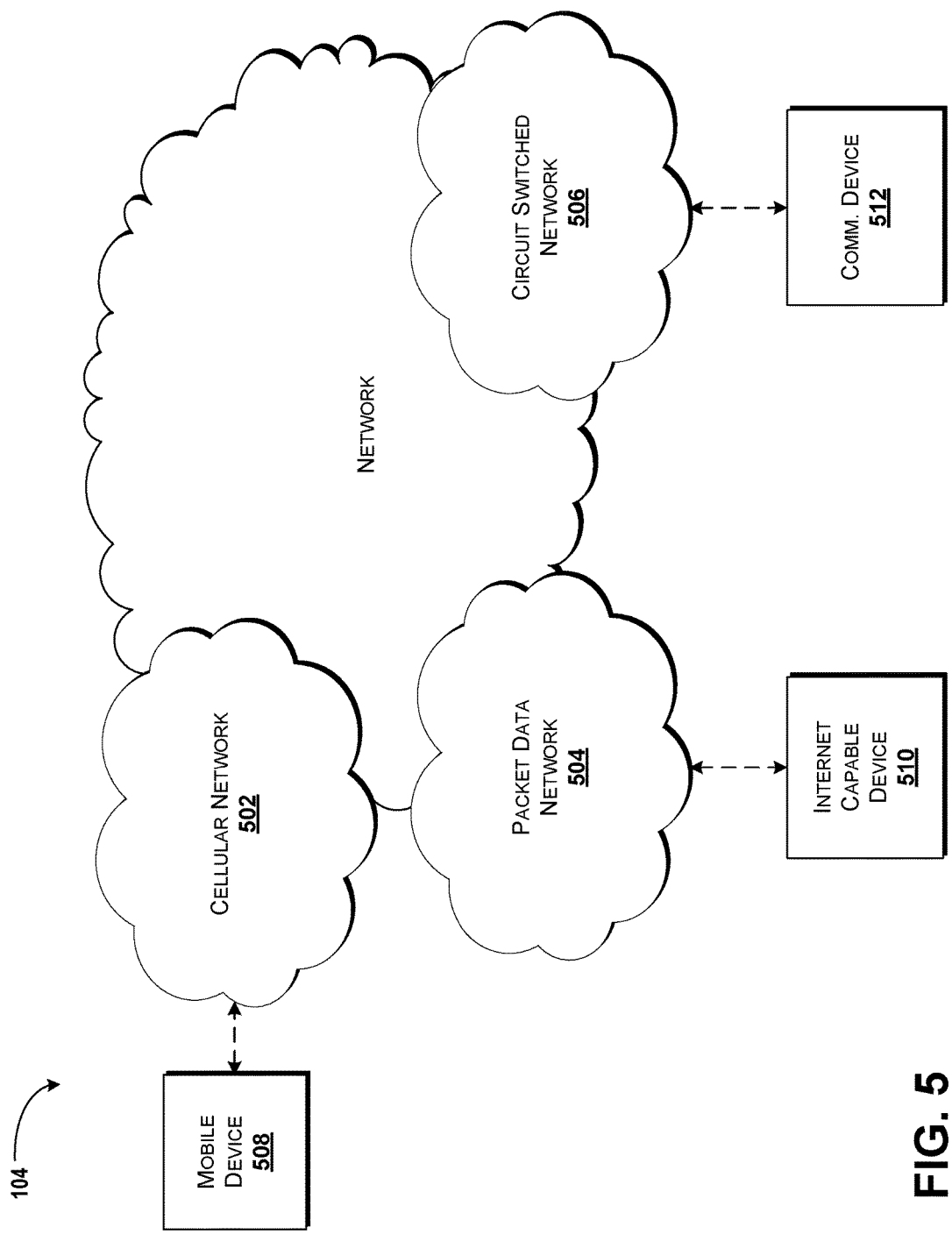
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G and 5G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
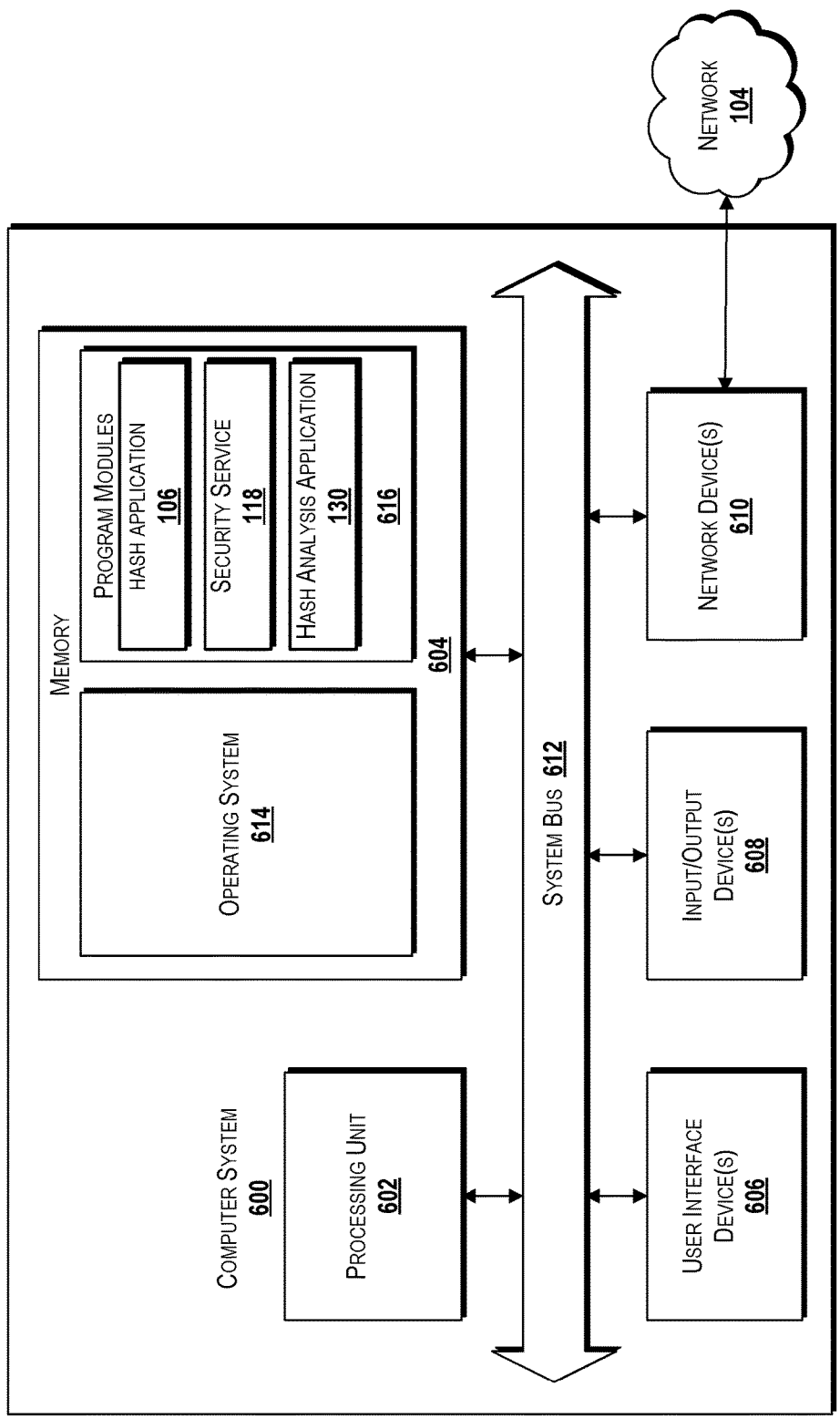
FIG. 6 is a block diagram illustrating an example computer system configured to filter network traffic using protected filtering mechanisms, according to some illustrative embodiments.

FIG. 6 is a block diagram illustrating a computer system 600 configured to provide the functionality described herein for filtering network traffic using protected filtering mechanisms, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 can include one or more of the hash application 106, the security service 118, and/or the hash analysis application 130. These and/or other programs can be embodied in computer-readable media containing instructions that, when executed by the processing unit 602, perform one or more of the methods 200, 300, 400 described in detail above with respect to FIGS. 2-4. According to some embodiments, the program modules 616 may be embodied in hardware, software, firmware, or any combination thereof. Although not shown in FIG. 6, it should be understood that the memory 604 also can be configured to store one or more of the signatures 120, the hash keys 112, the signature representations 114, the obfuscated signature 124, the hash 128, the filtering decision 132, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media as defined herein.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for filtering network traffic using protected filtering mechanisms have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
    generating, by a first device comprising a processor, a hash key, a signature representation, and an obfuscated signature, wherein the signature representation represents a signature that is available to the first device, and wherein the signature is not available to a second device and a third device;
    providing, by the first device and to the second device, the hash key and the signature representation, wherein the hash key and the signature representation are provided without the signature that is represented by the signature representation, and wherein the second device is configured to
receive traffic that is to be filtered,
generate, using the hash key and the signature representation, a hash value based on the traffic, and
provide the hash value and the traffic to the third device; and
providing, by the first device and to the third device, the obfuscated signature, wherein the third device is configured to generate a filtering decision using the obfuscated signature and the hash value without having the signature, and wherein the filtering decision relates to the traffic.

2. The method of claim 1, wherein the second device comprises a traffic analyzer that executes a hash application that, when executed by the traffic analyzer, causes the traffic analyzer to generate the hash value by performing operations comprising:
analyzing the traffic to identify data that corresponds to information included in the signature representation; and
applying the hash key to the data to generate the hash value.

3. The method of claim 1, wherein generating the obfuscated signature comprises applying the hash key to sensitive information included in the signature.

4. The method of claim 1, wherein the signature is stored at a data storage location within a restricted environment that is inaccessible to the second device.

5. The method of claim 1, wherein the third device comprises a hash analyzer that executes a hash analysis application that, when executed by the hash analyzer, causes the hash analyzer to perform operations comprising:
receiving the hash value and the traffic;
determining, based upon the hash value and the obfuscated signature, if the traffic is to be blocked; and
outputting the filtering decision, wherein the filtering decision indicates if the traffic is to be blocked.

6. The method of claim 1, wherein the first device comprises a server computer hosted within a restricted environment, and wherein the signature is stored within the restricted environment.

7. The method of claim 6, wherein the restricted environment comprises a sensitive compartmented information facility.

8. A system comprising:
a first device comprising a processor; and
a memory that stores computer-executable instructions that, when executed by the processor, cause the processor to perform operations comprising
generating a hash key, a signature representation, and an obfuscated signature, wherein the signature representation represents a signature that is available to the first device, and wherein the signature is not available to a second device and a third device,
providing, to the second device, the hash key and the signature representation, wherein the hash key and the signature representation are provided without the signature that is represented by the signature representation, and wherein the second device is configured to
receive traffic that is to be filtered,
generate, using the hash key and the signature representation, a hash value based on the traffic, and
provide the hash value and the traffic to the third device, and
providing, to the third device, the obfuscated signature, wherein the third device is configured to generate a filtering decision using the obfuscated signature and the hash value without having the signature, and wherein the filtering decision relates to the traffic.

9. The system of claim 8, wherein the second device comprises a traffic analyzer that executes a hash application that, when executed by the traffic analyzer, causes the traffic analyzer to generate the hash value by performing operations comprising:
analyzing the traffic to identify data that corresponds to information included in the signature representation; and
applying the hash key to the data to generate the hash value.

10. The system of claim 8, wherein generating the obfuscated signature comprises applying the hash key to sensitive information included in the signature.

11. The system of claim 8, wherein the third device comprises a hash analyzer that executes a hash analysis application that, when executed by the hash analyzer, causes the hash analyzer to perform operations comprising:
receiving the hash value and the traffic;
determining, based upon the hash value and the obfuscated signature, if the traffic is to be blocked; and
outputting the filtering decision, wherein the filtering decision indicates if the traffic is to be blocked.

12. The system of claim 8, wherein the first device comprises a server computer hosted within a restricted environment, and wherein the signature is stored within the restricted environment.

13. The system of claim 12, wherein the restricted environment comprises a sensitive compartmented information facility.

14. The system of claim 8, wherein the signature is stored at a data storage location within a restricted environment that is inaccessible to the second device.

15. A computer storage medium having computer-executable instructions stored thereon that, when executed by a processor, cause the processor to perform operations comprising:
generating, by a first device, a hash key, a signature representation, and an obfuscated signature, wherein the signature representation represents a signature that is available to the first device, and wherein the signature is not available to a second device and a third device;
providing, to the second device, the hash key and the signature representation, wherein the hash key and the signature representation are provided without the signature that is represented by the signature representation, and wherein the second device is configured to
receive traffic that is to be filtered,
generate, using the hash key and the signature representation, a hash value based on the traffic, and
provide the hash value and the traffic to the third device; and
providing, to the third device, the obfuscated signature, wherein the third device is configured to generate a filtering decision using the obfuscated signature and the hash value without having the signature, and wherein the filtering decision relates to the traffic.

16. The computer storage medium of claim 15, wherein the second device comprises a traffic analyzer that executes a hash application that, when executed by the traffic analyzer, causes the traffic analyzer to generate the hash value by performing operations comprising:

analyzing the traffic to identify data that corresponds to information included in the signature representation; and applying the hash key to the data to generate the hash value.

17. The computer storage medium of claim 15, wherein the third device comprises a hash analyzer that executes a hash analysis application that, when executed by the hash analyzer, causes the hash analyzer to perform operations comprising:

receiving the hash value and the traffic;

determining, based upon the hash value and the obfuscated signature, if the traffic is to be blocked; and outputting the filtering decision, wherein the filtering decision indicates if the traffic is to be blocked.

18. The computer storage medium of claim 15, wherein the first device comprises a server computer hosted within a restricted environment, and wherein the signature is stored within the restricted environment.

19. The computer storage medium of claim 18, wherein the restricted environment comprises a sensitive compartmented information facility.

20. The computer storage medium of claim 15, wherein generating the obfuscated signature comprises applying the hash key to sensitive information included in the signature.

* * * * *